(12) United States Patent
Arnold

(10) Patent No.: US 6,587,790 B1
(45) Date of Patent: Jul. 1, 2003

(54) ANTI-TERROR REPORTING SYSTEM

(76) Inventor: Vaughn R. Arnold, 12167 Orange Blvd., West Palm, FL (US) 33412

( * ) Notice: Subject to any disclaimer, the term of this patent is extended or adjusted under 35 U.S.C. 154(b) by 0 days.

(21) Appl. No.: 10/205,030

(22) Filed: Jul. 26, 2002

(51) Int. Cl.[7] .............................................. G01C 21/26
(52) U.S. Cl. ........................ 701/213; 701/213; 701/207; 342/357.09
(58) Field of Search ................................. 701/200–213; 342/357.01, 357.06, 357.09, 357.17

(56) References Cited

U.S. PATENT DOCUMENTS

| | | |
|---|---|---|
| 5,751,246 A | 5/1998 | Hertel |
| 5,795,178 A | 8/1998 | Schilder et al. |
| 5,918,183 A | 6/1999 | Janky et al. |
| 5,933,098 A | 8/1999 | Haxton |
| 6,092,008 A | 7/2000 | Batteman |
| 6,405,126 B1 | 6/2002 | Palomo et al. |

Primary Examiner—Richard M. Camby
(74) Attorney, Agent, or Firm—McHale & Slavin, P.A.

(57) ABSTRACT

An integrated anti-terrorist security system for mobile conveyances and vehicles has an activator mounted on the conveyance. The activator is interfaced with a geographical locator component based on RADAR, GPS, LORAN or other satellite communications systems to establish the location of a conveyance. The system includes a control unit having a computer with a CPU and memory to receive and store the geographical coordinates of the established location. A communications component of the system sends a signal to proper authorities when the stored geographical coordinates change.

18 Claims, 3 Drawing Sheets

ANTI-TERROR REPORTING SYSTEM

FIELD OF THE INVENTION

This invention relates to the field of vehicle tracking, monitoring and reporting to provide a warning or alert when a vehicle deviates from a pre-selected geographical reference.

BACKGROUND OF THE INVENTION

In the post-September 11, 2001 world, the public has become acutely aware of the innumerable items that could prove dangerous when under control of certain people, such as terrorists. Numerous alerts have been issued by the government suggesting the use of trucks, boats, planes, cargo containers, tanker trucks, and emergency vehicles as terror weapons. With the realization of the types of vehicles and the sheer numbers of such conveyances that can be converted into weapons of mass destruction, comes the shock of how little information is known about the whereabouts of these items at any given point in time.

Fortunately, the larger of the vehicles, such as ships, commercial airplanes, large trucks and trains follow recognized routes along the highways, rivers, tracks and electronic airways in the normal flow of commerce. While these vehicles are moving, during normal operations, there is usually some information available concerning their whereabouts. However, there is no system in place that can quickly differentiate between normal flow of commerce and unauthorized use of a conveyance.

What is needed is a security system to monitor and track such vehicles and alert authorities to the possibility of mis-use of the vehicles based on an alert initiated by the vehicle upon surreptitious displacement from an authorized location.

The system of this invention meets this need by providing a security system for tracking and monitoring such conveyances referenced to pre-selected geographical coordinates and providing a communication to proper authorities when such vehicles deviates from a pre-selected area.

DESCRIPTION OF THE PRIOR ART

The Palomo et al patent, U.S. Pat. No. 6,405,126, teaches a system for providing an in-vehicle route display based on a preselected intended destination for a conveyance.

U.S. Pat. No. 6,092,008 is directed toward substituting ground based recording and storage of in-flight data for the "black boxes" carried by commercial airliners. The system includes an alert signal generating phase activated when the operational data is outside normal limits. The system uses GPS (Global Positioning System) or other locating devices for geographical location of the aircraft. The communications may be by satellite, telemetry, or cellular systems. The in-flight data is transmitted to a ground based receiver and storage facility.

The patent to Haxton, U.S. Pat. No. 5,933,098, discloses an aircraft security system using an aircraft mounted sending unit that sends a timed signal to a central computer once the system is armed. A central computer monitors the various aircraft at a facility. Appropriate alarms are generated, if the signal is not received according to schedule. The system may also include intrusion alarms on the aircraft to indicate tampering. A tracking function uses GPS data to locate an aircraft and transmit the location to the central computer when the aircraft is within the bounds of the network.

U.S. Pat. No. 5,918,183 to Janky et al discloses a mobile transceiver for broadcasting and receiving a radio signal in the cellular telephone band coupled with a GPS for generating a geographical fix. The device is concealed on a vehicle and can signal the police with a fix. The system is activated by an engine start, auto alarm or abnormal engine start.

Onuma, U.S. Pat. No. 5,796,178, discloses a vehicle mounted system that memorizes or stores the position of engine stop and compares that position with position of attempted engine start. The system blocks engine start if the positions do not match within a predetermined range.

U.S. Pat. No. 5,751,246 teaches a system for establishing an electronic geographic perimeter for items equipped with a mobile GPS unit. The permitted geographic perimeter must be loaded into the database by keyboard or other conventional method. The GPS unit continuously sends a signal to the control unit. The control unit sends an alarm when the GPS unit crosses the perimeter boundary. The system can also be used to locate particular items within the perimeter boundary.

What is needed is a system that electronically establishes a geographical position of a conveyance in its last authorized position and automatically notifies the proper authorities upon the unauthorized movement of that conveyance.

SUMMARY OF THE INVENTION

An integrated anti-terrorist security system for mobile conveyances and vehicles such as airplanes wherein an activator is mounted on the conveyance. The activator is interfaced with a geographical locator component based on RADAR, GPS, LORAN or other satellite communications systems to establish the location of a conveyance. The system includes a control unit having a computer with a CPU and memory to receive and store the geographical coordinates of the established location. A communications component of the system sends a signal to proper authorities when the stored geographical coordinates change.

Accordingly, it is an objective of the instant invention to teach an integrated electronic system which generates a signal including the geographical coordinates of a movable device as a reference location and generates an alert signal when the device moves from the reference location.

It is a further objective of the instant invention to teach an integrated electronic system that has multiple modes to provide for authorized movement of a vehicle or conveyance without generating an alert.

It is another objective to teach an integrated electronic system to provide geographical coordinates, speed, direction, elevation during authorized or non-authorized movement upon being electronically interrogated. This data may be superposed on a map.

It is yet another objective of the instant invention to teach that the integrated system continues to signal the geographical location coordinates after generating the alert.

It is a still further objective of the invention to teach integrating this system into the existing systems of suitably equipped aircraft, cars, trucks, marine craft and other vehicles.

It is a further objective of the invention to teach an aircraft monitoring system having a particular benefit for airports with unmanned facilities and small planes, for example, private planes and crop dusters.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DESCRIPTION OF THE INVENTION

GPS is an acronym for a conventional global positioning system based on triangulation between multiple satellites to locate a mobile unit anywhere in the world. GPS will replace most other ground based navigation systems, such as LORAN which is a system of long range radio stations and the short range, VOR, aviation net. Also, for aircraft equipped with the GPS unit, the position and tracking of the aircraft is comparable to RADAR. Initially, the GPS units were being placed in airplanes, boats, and road vehicles but the new uses of the system continue to expand, such as inventory control and marketing.

The anti-terrorist security system 10 of this invention makes use of GPS as a central component of an integrated system. Of course, the system has broader implications in general commerce where security may not be of prime importance. But for purposes of security, the mobile units which must be mounted on any conveyance in this system should be placed in such a manner that access to the mobile unit is extremely difficult. The mounting should include concealment, where possible, and re-enforcement. These considerations include the placement of the GPS and communication antennas, as well. The security system 10 may include the use of a switch or entry of data, including a PIN (personal identification number) if desired, into the CPU for activation. The activation could be automatic based upon no movement for a certain time period. The overall object of the installation is to prevent discovery of the system and prevent injury to authorized personnel in any attempt to deactivate the system.

Figure 1:
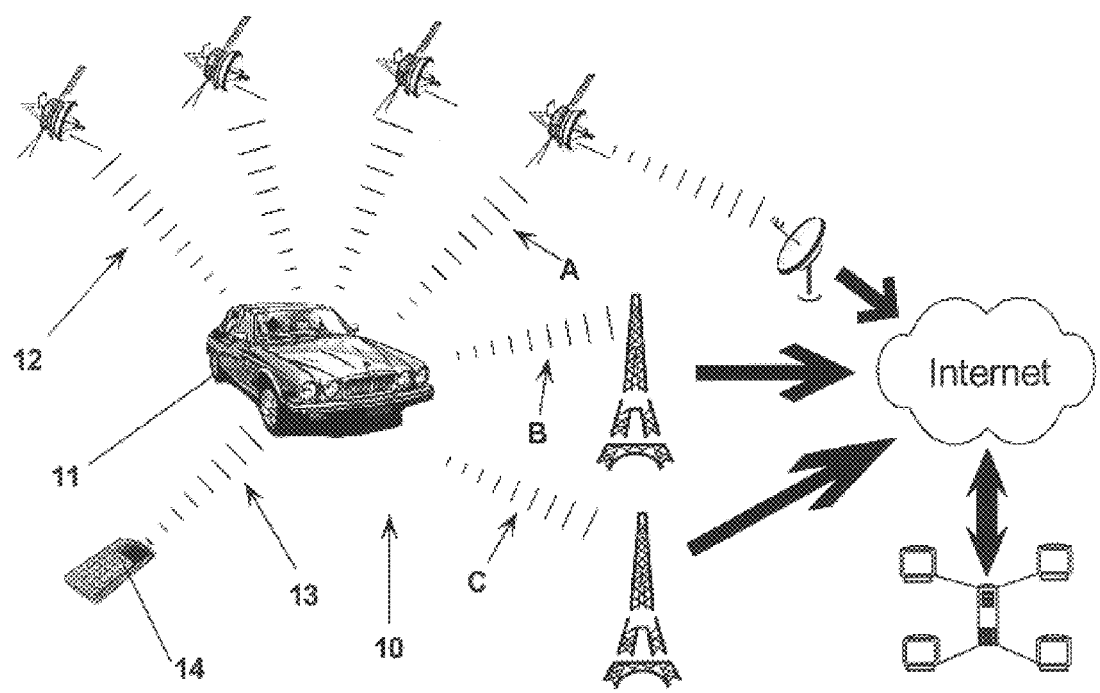
FIG. 1 is a representation of the integrated security system of this invention.

FIG. 1 illustrates the integrated system 10 with the car 11 representing any mobile conveyance. The car is equipped with a GPS component 12, depicted by the multiple satellites, with an on-board control unit and a communications component. The activator 13 is shown as a conventional remote 14, like a garage door opener or TV channel changer, which sets or clears a command in the control unit. Once the activator arms the security system, the location of the conveyance is an authorized location placed in the memory of the computer. Any subsequent movement of the conveyance from the authorized location will be detected by the GPS 12. The control unit activates the communications component to send an alert signal. As shown in FIG. 1, the alert signal may be any one of or all those illustrated, including a satellite link A, a cellular phone link B and/or 2-way pager C. Each of the communications servers can connect to the internet to provide PC based information.

Figure 2:
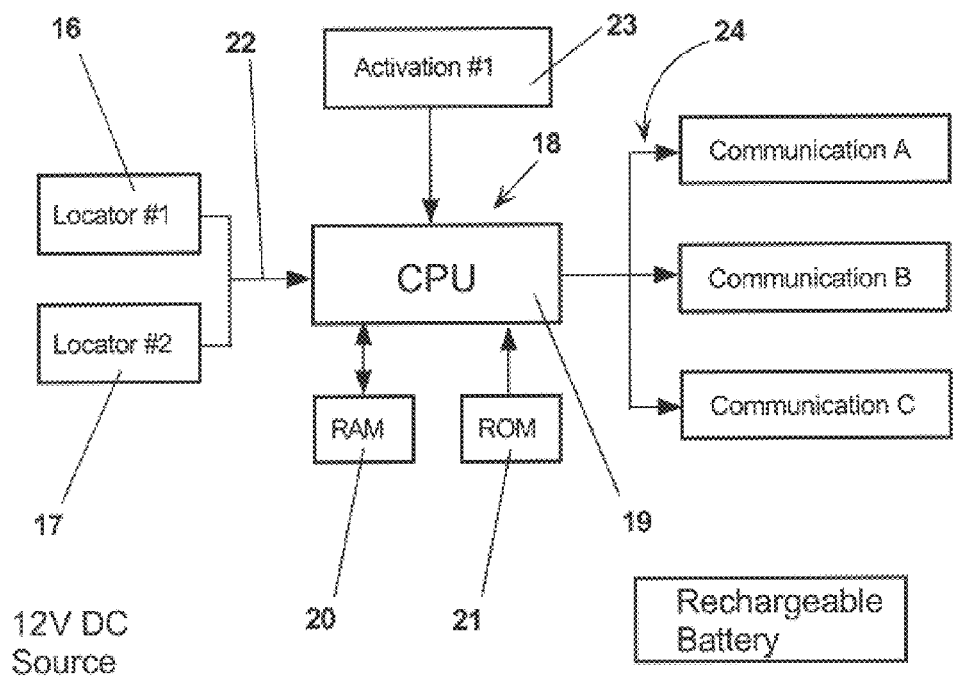
FIG. 2 is a diagram of the hardware modules of this invention.

The hardware components are conventional. The system can be powered by a 12 volt DC electrical harness. The electric power may be batteries or any other source mounted on the conveyance or connected to the conveyance. As shown in FIG. 2, two locator units 16 and 17 are illustrated which may operate in different electronic positioning systems, such as GPS or LORAN. Each of these locator units may be mounted on a different conveyance or both may be the same conveyance. The security system may also use only a single positioning system. The locator units include, at least, an antenna and a receiver (not shown). The locator units are connected to a control unit computer 18 having a CPU 19 with a RAM 20 and ROM 21. The connection 22 may be hard wired or electronic to a remote computer.

The activator 13 which may be a switch or a data entry device such as remote 14. The switch may take the form of a toggle switch or a multiple position switch, or a key lock. The data entry device may have a key pad such as a Palm Pilot. The activator could be activated and deactivated by a telephone or computer as shown on the communications side of FIG. 1. Once the system is activated and in the Armed mode, the GPS receiver is ON and continually receives GPS updates. The up dates may be spaced periodically to conserve electrical power. In these cases, the computer in the control unit 18 stores the GPS data until the satellites are reacquired by the GPS. In another embodiment of the invention, the control unit may be programmed to permit movement within a certain set of coordinates such as a marine terminal with container storage or a railroad classification yard, or a truck part, or an airport, or an area of flight operations like a training area or flight plan. The GPS signal is sent to the computer 19 which compares each new signal with the stored position to determine if the conveyance is outside the permitted coordinates. If the coordinates are for an un-authorized position, the control unit 18 causes an ALERT to be sent by the communications component 24.

When the activator is in the Armed mode and the STAY mode is selected, the computer stores the geographical coordinates produced by the GPS. These coordinates are considered an authorized location. If a GPS update gives different geographical coordinates from those saved, while in the STAY mode, the control unit sends an ALERT message by the communications component 24. As shown in FIGS. 1 and 2, the ALERT message may be sent by any one or all three A, B, and C communication systems. Obviously, the system may be equipped with only one of the communications links. The recipients of the ALERT message can be anyone or any office placed in the address list of the communications component, for example, owners, operators, private security companies, dispatchers, guards, air traffic control or armed forces are among those who be notified.

Figure 3:
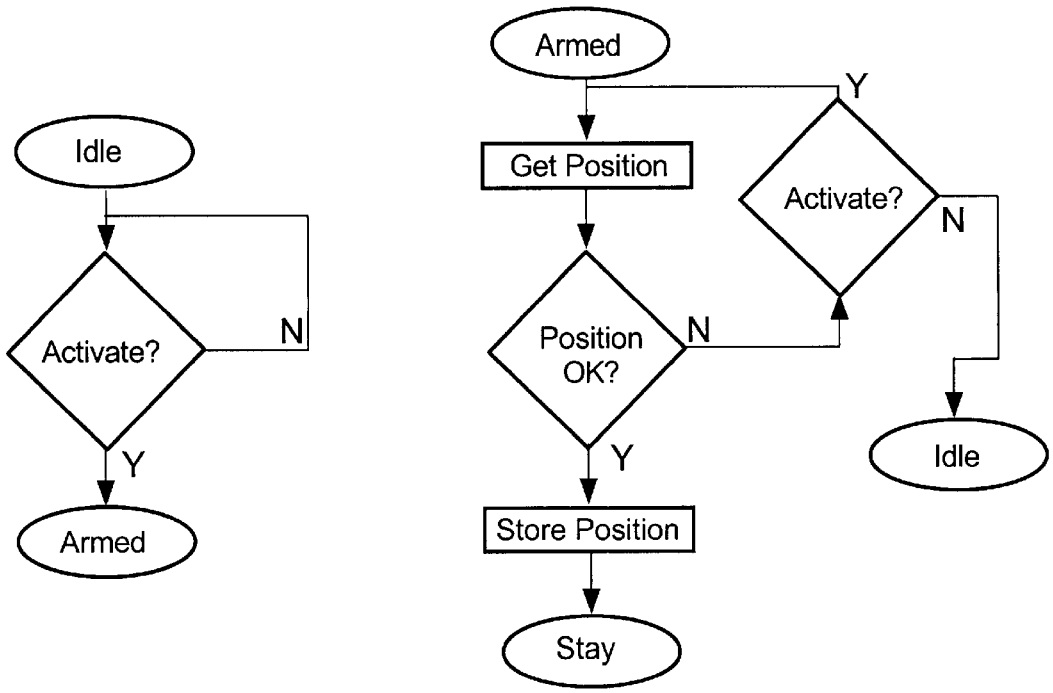
FIG. 3 is a block diagram of one logic circuit of this invention.

FIG. 3 illustrates the internal logic circuits of the security system with the activation being an either/or option between the ARMED mode and the IDLE mode. Once the ARMED mode is selected by the activator, the system may return to IDLE when a good position is acquired by the GPS. This position's coordinates are the same as stored when STAY command is entered in the system.

Figure 4:
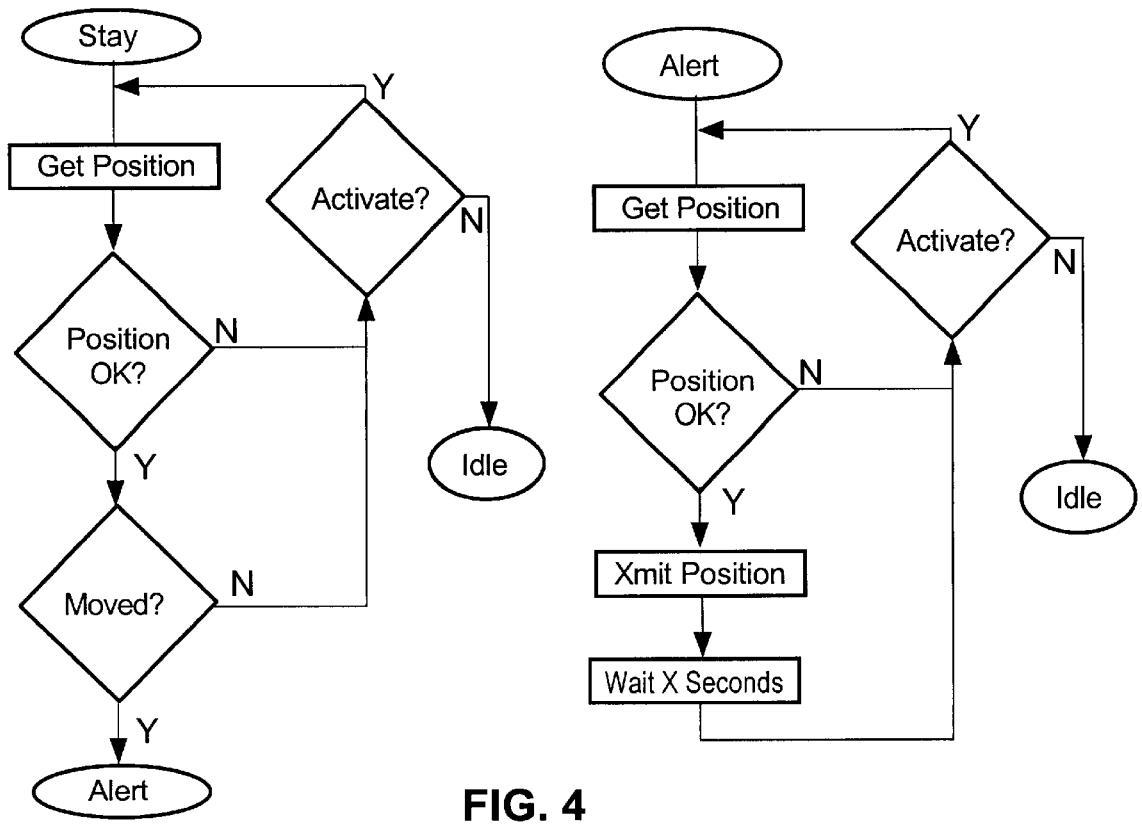
FIG. 4 is a block diagram of another logic circuit of this invention.

FIG. 4 shows the logic steps during the STAY phase of operation. The system may be shut down or remain in STAY mode. In STAY mode, the GPS continually gets position and compares to stored position, in FIG. 3, if position is same or within permitted parameters, position is OK. If location is different or outside limits, it has moved. The control unit issues an ALERT through the communications component.

Once the ALERT message is issued, the system gets position continuously or periodically. New ALERTS are issued with new position on a schedule.

Also, during the period when the STAY mode is selected but no ALERT has been issued, the system may be interrogated by any of the communications links shown in FIG. 1. Upon interrogation the system will report it's current coordinates and/or speed, direction, elevation. This information may be imposed on a map of any derivation. This is useful when a perimeter or flight plan or corridor is given as permissible coordinates but the exact location within the perimeter is not immediately known.

Further, in the IDLE mode, any of the communications links may be used to interrogate the system to change to the ARMED mode, either on command, randomly or timed sequence. If no response is forthcoming a physical check should be implemented since loss of electrical power or tampering is indicated.

Figure 5:
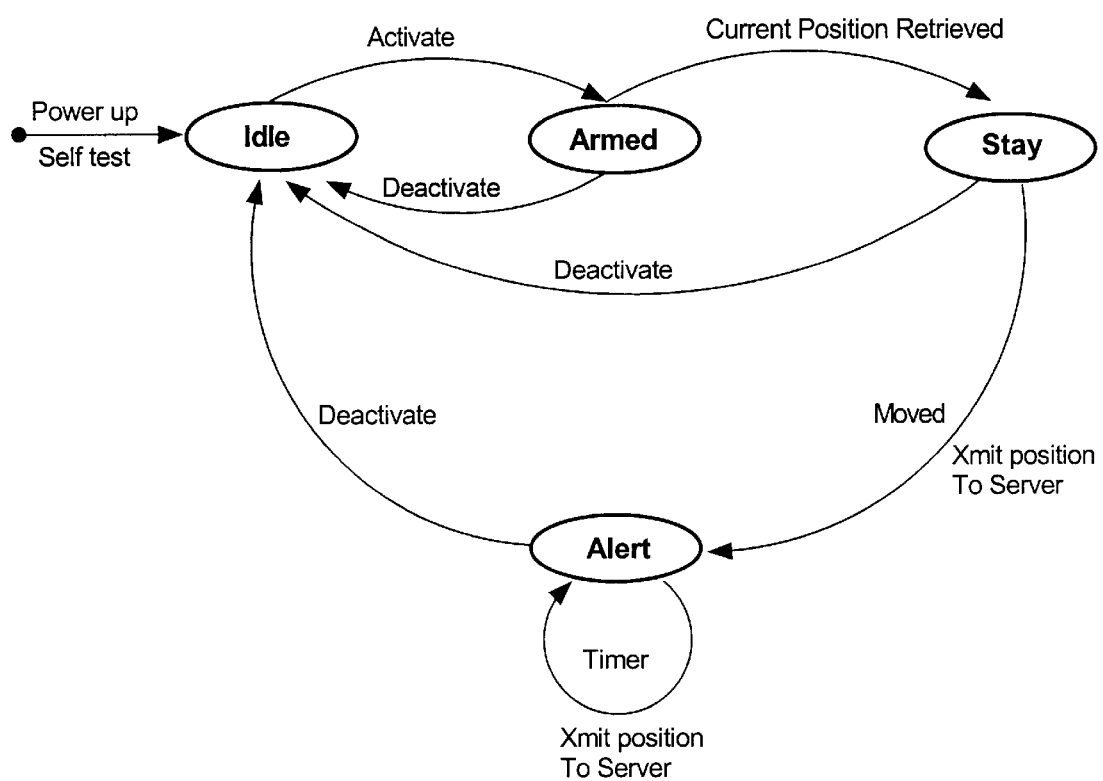
FIG. 5 is a block diagram of the modes of the system of this invention.

The system modes are illustrated in FIG. 5. There is a power up and self test mode upon initiation of the system. A powered up and ARMED mode may be selected. The STAY mode stores current position. The ALERT mode is transmitting to selected addresses upon movement of the conveyance from STAY position. The ALERT continues to transmit position reports until deactivated.

In airplanes, usually equipped with GPS, radios, transponders, and emergency locator transmitters (ELT), the integrated system could utilize the GPS computer with another page of programming to include the IDLE, ARMED, and STAY modes. The STAY mode stores the position coordinates when STAY is selected. The on-board GPS then periodically compares the stored position to the current position. If the coordinates do not match, the GPS unit activates the radios, transponder or ELT to send the ALERT signal. The IDENT function of the transponder could be used to get attention on the air traffic control radar units in range. The ELT broadcasts on the International distress frequency monitored by several agencies. None of these alarms would necessarily be observable in the cockpit of the plane. Further, if the plane has a cell phone or air phone, it could be tied into the integrated system for issuing the ALERT signal. As mentioned, the system could be intermittently ARMED, by radio or any link shown in FIG. 1, to conserve electrical power. If no response is received, the indication is battery failure or tampering.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A security system for establishing and monitoring the location of a mobile conveyance and reporting the movement of the mobile conveyance, the system comprising an activator component having multi-modes adapted to be mounted on the mobile conveyance and connected to a control unit, said activator producing a real time signal to said control unit, said control unit including a computer having a CPU with a memory and a geographical locator component for producing geographical coordinates of said real time signal of said activator component, said activator signaling said computer to read and store said geographical coordinates of said activator when said activator STAY mode is selected, said computer comparing said geographical coordinates of said real time signal and said geographical coordinates of said STAY mode, said control unit connected to a communications component for automatically sending an alert when said real time signal of said activator is displaced from said stored STAY geographical coordinates.

2. A security system of claim 1 further comprising said activator being a wireless unit with a multi-position switch designating each of said multi-modes.

3. A security system of claim 2 further comprising said activator producing said real time signal periodically.

4. A security system of claim 2 further comprising said control unit interrogating said activator to produce said real time signal.

5. A security system of claim 2 further comprising a discrete electrical power source connected to said activator.

6. A security system of claim 5 further comprising an electrical connection on said activator adapted to connect to the electrical system of a conveyance.

7. A security system of claim 2 further comprising an electrical connection on said activator adapted to connect to the electrical system of a conveyance.

8. A security system of claim 1 further comprising said communications component including a connection to a wireless net and said alert is aural, visual or image enhancement.

9. A security system of claim 8 further comprising said communications component including a connection to commercial telephony systems and said aural alert is a prerecorded message.

10. A security system of claim 1 further comprising said activator, said control unit and said communications component being self contained and adapted to be mounted on a conveyance.

11. A security system of claim 10 further comprising said activator and said geographical locator component adapted to be mounted on said conveyance and said control unit and said communications component remotely located.

12. A security system of claim 1 further comprising said activator having a IDLE mode in which said activator produces no real time signal.

13. A security system of claim 1 further comprising said activator having a IDLE mode in which said communications component sends no alert.

14. A security system of claim 1 further comprising said system having a means for receiving an interrogation through said communications component to said geographical locator, said geographical locator giving current coordinates in response to said interrogation.

15. An anti-terrorist security system for airplanes equipped with an electrical system, radios and GPS for establishing, monitoring, and reporting the location thereof comprising an activator adapted to be interfaced with said GPS, a control unit including a computer connected to an activator and a communications component adapted to be interfaced with said radios, said control unit adapted to connect to said GPS and said electrical system, said activator having a multiple position switch designating multi-modes, said multi-modes including a STAY mode in which said control unit supplies electrical power to said GPS and records said GPS generated geographical coordinates of said activator, said control unit interrogating said GPS periodically in real time and comparing said real time GPS generated geographical coordinates with the recorded GPS generated geographical coordinates, said control unit activating said communications component to send an alert by radio when said real time coordinates are different from said recorded coordinates.

16. An anti-terrorist security system of claim 15 further comprising said STAY mode including a plurality of preselected geographical coordinates of a flight plan are entered in said GPS and said control unit, said control unit interrogating said GPS periodically in real time and comparing said real time GPS generated coordinates with said plurality of preselected geographical coordinates, said control unit activating said communications component to send an alert by radio when said real time coordinates are different from said plurality of said preselected coordinates.

17. An anti-terrorist security system of claim 16 wherein said airplane is equipped with a transponder further comprising said control unit activating said communications component to initiate the IDENT command of said transponder.

18. A method of deterring unauthorized use of a conveyance comprising the steps of:
- a) providing an electronic activator including a GPS, a transmitter and a multi-mode switch with at least IDLE, ARMED, and STAY, positions,
- b) mounting said activator on said conveyance,
- c) providing a control unit including a computer with a CPU and memory connected to said activator, said control unit having a communications component for sending an alarm,
- d) selecting STAY position when said conveyance is positioned in a desired location,
- e) sending a real time signal from said activator to said control unit with geographical coordinates of said desired location,
- f) reading and storing said geographical coordinates by said control unit,
- g) sending subsequent real time signals with the geographical coordinates of the real time location,
- h) comparing said stored geographical coordinates with said subsequent geographical coordinates,
- i) activating said communications component to alert authorities when said stored geographical coordinates are not the same as subsequent geographical coordinates, and
- j) continuing to update subsequent geographical coordinates.

\* \* \* \* \*